US006918095B1

(12) United States Patent
Agnes et al.

(10) Patent No.: US 6,918,095 B1
(45) Date of Patent: Jul. 12, 2005

(54) DIMENSION GENERATION FILTER AND ANALYSIS

(75) Inventors: Fabrice Agnes, Rueil Malmaison (FR); Alain Mouky, Argenteuil (FR)

(73) Assignee: Dassault Systemes, Suresenes Cedex (FR)

( * ) Notice: Subject to any disclaimer, the term of this patent is extended or adjusted under 35 U.S.C. 154(b) by 0 days.

(21) Appl. No.: 09/329,923

(22) Filed: Jun. 10, 1999

(51) Int. Cl.$^7$ ............................................. G06F 15/00
(52) U.S. Cl. ...................................... 715/849; 715/964
(58) Field of Search .................. 345/419–427, 345/428, 663–665, 679–680, 653–654, 658, 652, 157, 659, 771, 782, 826, 849, 846, 850–852; 715/848–852, 757, 782, 821–823, 964, 967–968, 798–801, 744–747; 606/130

(56) References Cited

U.S. PATENT DOCUMENTS

| | | | | |
|---|---|---|---|---|
| 5,202,961 A | | 4/1993 | Mills et al. ................... | 395/159 |
| 5,548,706 A | | 8/1996 | Koizumi et al. ............. | 395/161 |
| 5,655,095 A | | 8/1997 | LoNegro et al. ............. | 395/349 |
| 5,687,305 A | * | 11/1997 | Graham et al. .............. | 345/632 |
| 5,701,403 A | * | 12/1997 | Watanabe et al. ........... | 345/419 |
| 5,708,764 A | * | 1/1998 | Borrel et al. ................ | 345/419 |
| 5,729,673 A | * | 3/1998 | Cooper et al. | |
| 5,745,666 A | * | 4/1998 | Gilley et al. ................ | 345/848 |
| 5,857,032 A | * | 1/1999 | Wang et al. ................. | 382/154 |
| 5,990,897 A | * | 11/1999 | Hanratty ..................... | 345/420 |
| 6,040,836 A | * | 3/2000 | Shiitani et al. ............. | 345/427 |
| 6,124,864 A | * | 9/2000 | Madden et al. ............. | 345/473 |
| 6,137,491 A | * | 10/2000 | Szeliski ...................... | 345/419 |
| 6,165,181 A | * | 12/2000 | Heilbrun et al. ............ | 606/130 |
| 6,169,552 B1 | * | 1/2001 | Endo et al. .................. | 345/427 |
| 6,219,444 B1 | * | 4/2001 | Shashua et al. ............. | 382/154 |
| 6,224,249 B1 | * | 5/2001 | Ozawa et al. ................. | 703/1 |
| 6,281,903 B1 | * | 8/2001 | Martin et al. ............... | 345/421 |
| 6,308,144 B1 | * | 10/2001 | Bronfeld et al. .............. | 703/2 |
| 6,466,239 B2 | * | 10/2002 | Ishikawa .................... | 345/850 |
| 6,492,986 B1 | * | 12/2002 | Metaxas et al. ............. | 345/420 |
| 6,542,937 B1 | * | 4/2003 | Kask et al. .................. | 719/328 |
| 6,771,260 B1 | * | 8/2004 | Hazama et al. ............. | 345/420 |
| 6,775,581 B2 | * | 8/2004 | Landers et al. ............... | 700/98 |

FOREIGN PATENT DOCUMENTS

GB 2255661 5/1991

OTHER PUBLICATIONS

U. Roy et al., "Review of Dimensioning and Tolerancing: Representation and Processing", Computer Aided Design, Elsevier Publishers BV, Barking, GB, vol. 23, No. 7, Sep. 1, 1991.

European Search Report dated Mar. 31, 2004 from EP Application No. 00401390.

* cited by examiner

Primary Examiner—Steven P Sax
(74) Attorney, Agent, or Firm—James V. Mahon; Clifford Chance US LLP

(57) ABSTRACT

A method and apparatus for controlling generation of descriptive information, such as dimension generation, relating to creation of a 2-D view of a computer defined graphical model, such as a 3-D model. An option to choose a semi-automatic mode of generation can enable a user to interrupt generation and rework data being transferred from the 3-D model to the 2-D view. One embodiment provides a user with manual control of dimension and constraint generation such that the process can move from one step to the next, under a user's control. In another embodiment, a semi-automatic mode of operation provides a pause in the generation process. During the pause, the user can rework drawing data or halt the process to perform other tasks. In the absence of an interruption, the system can proceed to a next item of drawing data.

23 Claims, 9 Drawing Sheets

DIMENSION GENERATION FILTER AND ANALYSIS

BACKGROUND

The present invention relates to computer software utility programs, and more specifically to a machine and method for controlling the generation of dimensions, or other drawing data, while producing two dimensional (2-D) plans representing different views of a three dimensional (3-D) model with computer aided design (CAD) and computer aided manufacture (CAM) systems.

While using CAD/CAM applications it is often desirable to produce two 2-D plans representing different views of a 3-D model. Production of 2-D views from the 3-D model can be referred to as generative drafting. One of the difficulties attaching to the generative drafting process is the selection of a desirable drafting view. Once a user has selected an appropriate view, he can cause the system to transfer to a 2-D view of the dimension constraints (e.g. tolerances), or other data available with respect to the 3-D model.

In currently available CAD/CAM systems, transfer of dimensions and constraints, once requested by the user, is performed automatically by the system according to a predetermined set of rules. The rules can define which dimensions or other constraints will be shown on which view. Each dimension or other constraint can be shown on one and only one view and where each is located. If a user is dissatisfied with the presentation or location of one or more of the dimensions, they have to wait until the entire transfer is complete before being able to introduce modifications to the dimension presented. A modification can relate to a view chosen by the process algorithm, to the location on the view, or to the way a dimension is represented. While this automated process is generally acceptable with simple parts, it becomes a productivity limitation as a part grows more complex. Reworking 2-D plans to ensure that the dimensions and other constraints are located where the user would like them to be can be a fairly difficult, tedious and time consuming task, if a large number of dimensions have been transferred to one particular view and that view is overly encumbered with dimensions.

An ever increasing need for productivity improvements in the use of CAD/CAM systems has led to user requests for a more flexible dimension generation system which can allow a user to decide if and when he wishes to modify the location of dimensions and other constraints before all the dimensions are shown on the different views. There is therefore a need for providing a user with the capability to better control the dimension generation process.

SUMMARY OF THE INVENTION

Accordingly, the present invention provides a method and apparatus for controlling generation of descriptive information, such as dimension generation, during creation of a 2-D view of a computer defined graphical model. A user can be provided with an option to choose an automatic mode of operation, wherein a CAD/CAM or other computer system completes the transfer of all dimensions and other constraints before allowing the user to start reworking the plan, and a semi-automatic mode of operation, wherein a user may interrupt the transfer process and rework data that has-been transferred up to the point of interruption.

In one embodiment, a user can additionally be given the option of manual control dimension and constraint generation. With manual control, the process moves from one step to the next under the user's control. In a preferred embodiment, dimension or other drawing data can be generated in a semi-automatic mode of operation. With the semi-automatic mode the user may elect to pause the generation process. During the pause, the user can rework drawing data that needs to be reworked, or halt the process to perform other tasks. The need to perform another task can arise from the user's realization that some of the dimensions or other constraints already transferred by the system would better find their place if another view was added to the plan. This ability to create new views before the whole transfer process is completed can provide increased productivity. In one preferred embodiment, the system will be able to restart at the beginning of the process and reproduce all the modifications entered by the user prior to the time the process was stopped or paused.

In another aspect of the invention, a semi-automatic mode of operation can take into account filters defined by a user whereby the filters exclude drawing data items of the 3-D model or certain views of the 2-D plan from the generation process.

The invention may also include a software control method with steps for forming a two dimensional view of a computer defined graphical model, such as a three dimensional model. The software control method can generate a drawing data item, such as a dimension or constraint, associated with a component of the two dimensional view and form a user interface for controlling the addition of the drawing data item to the two dimensional view. A drawing data item can be added to the two dimensional view responsive to activation of a user interactive device comprising the user interface.

Generally, in another aspect of the invention, a drawing data item can be added to a two dimensional view semi-automatically responsive to the expiration of a predetermined time out period, in the absence of an intervening user action. Intervening actions can include activation of a pause button or other user interactive device such as a checkbox, a yes/no field, or other area of a screen responsive to a button click on a pointing device or other user control.

In still another aspect, dimension generation can be reworked to modify drawing data or delete the drawing data. Deletion can also be implemented such that the deleted data is removed from subsequent views of the object. In one embodiment, a user is able to stop the generation of drawing data by activation of a user activatible device. While the generation is stopped, a user can also form an additional two dimensional view. Changes or modifications to drawing data can be stored and reproduced in subsequently formed two dimensional views.

In another embodiment, the user can opt to have the program automatically generate additional drawing data following modification of a particular drawing data item.

This invention can also embody a computer system, a programmed computer, a computer program residing on a computer-readable medium or a method of interacting with a computer and embodying the concepts described above.

The details of one or more embodiments of the invention are set forth in the accompanying drawings and the description below. Implementations can provide advantages such as facilitating user customized dimensions and other related data in two dimensional views of a model. Other features, objects, and advantages of the invention will be apparent from the description, the drawings and the claims.

DETAILED DESCRIPTION OF THE INVENTION

Figure 1:
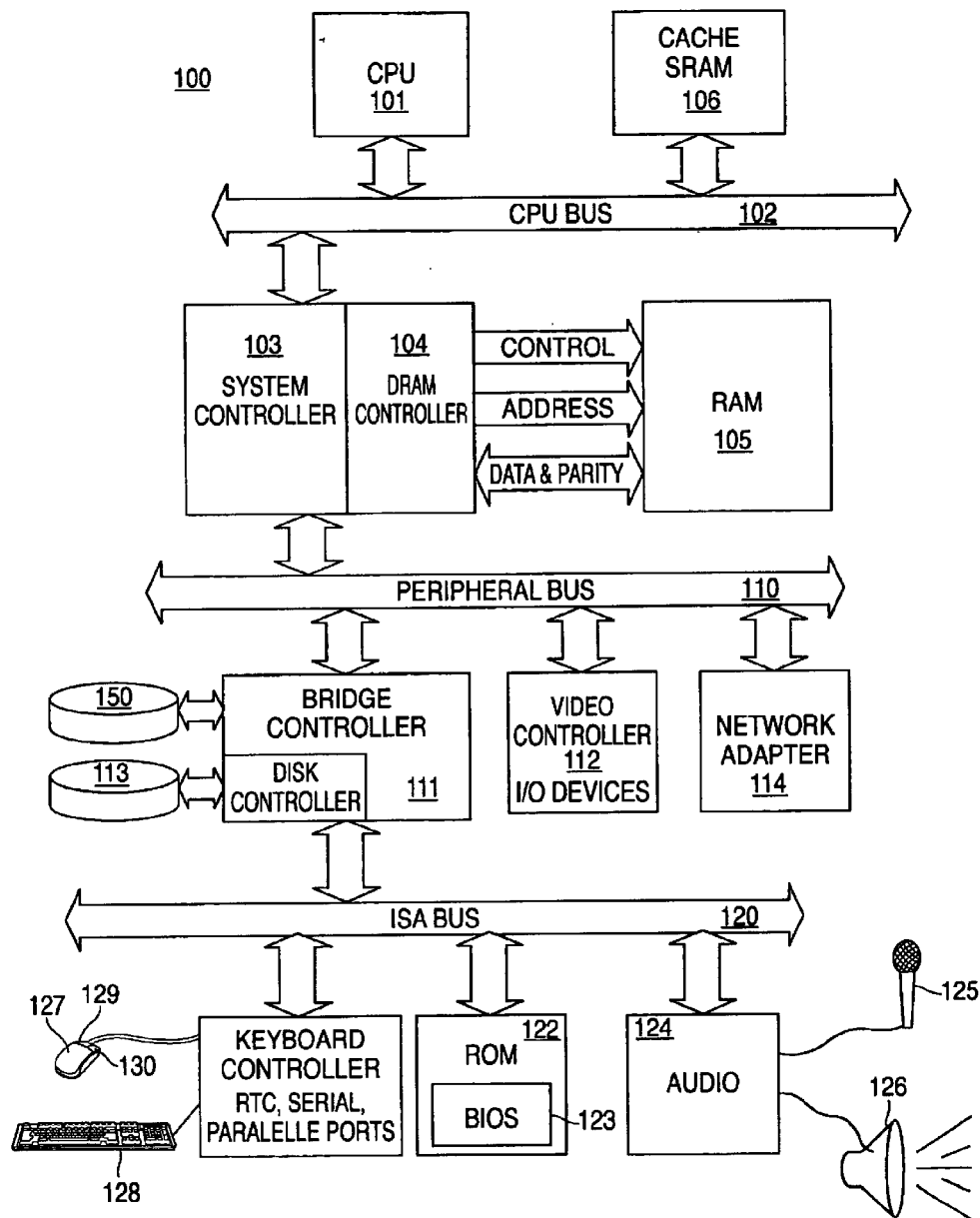
FIG. 1 is a block diagram of a computer system.

Referring to FIG. 1, physical resources of a computer system 100 are depicted. The computer 100 has a central processor 101 connected to a processor host bus 102 over which it provides data, address and control signals. The processors 101 may be any conventional general purpose single-chip or multi-chip microprocessor such as a Pentium series processor, a K6 processor, a MIPS processor, a Power PC processor or an ALPHA processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 114, a video display controller 112 coupled to a video display 115, and a keyboard and mouse controller 113 can be coupled to a peripheral bus 110 and controlled by the processor 101. The computer system can include a connection to a computer system network, an intranet or an internet. Data and information may be sent and received over such a connection.

The computer 100 can also include non-volatile ROM memory 107 to store basic computer software routines. ROM 107 may include alterable memory, such as EEPROM (Electronically Erasable Programmable Read Only Memory), to store configuration data. BIOS routines 123 can be included in ROM 107 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, the LINUX, the Apple MacOS™ operating system, or other operating system.

An operating system may be fully loaded in the RAM memory 105 or may include portions in RAM memory 105, disk drive storage 114, or storage at a network location. The operating system can provide functionality to execute software applications, software systems and tools of software systems. Software functionality can access the video display controller 112 or other resources of the computer system 100 to provide two dimensional (2-D) and three dimensional (3-D) models on the video computer display 115.

Figure 2:
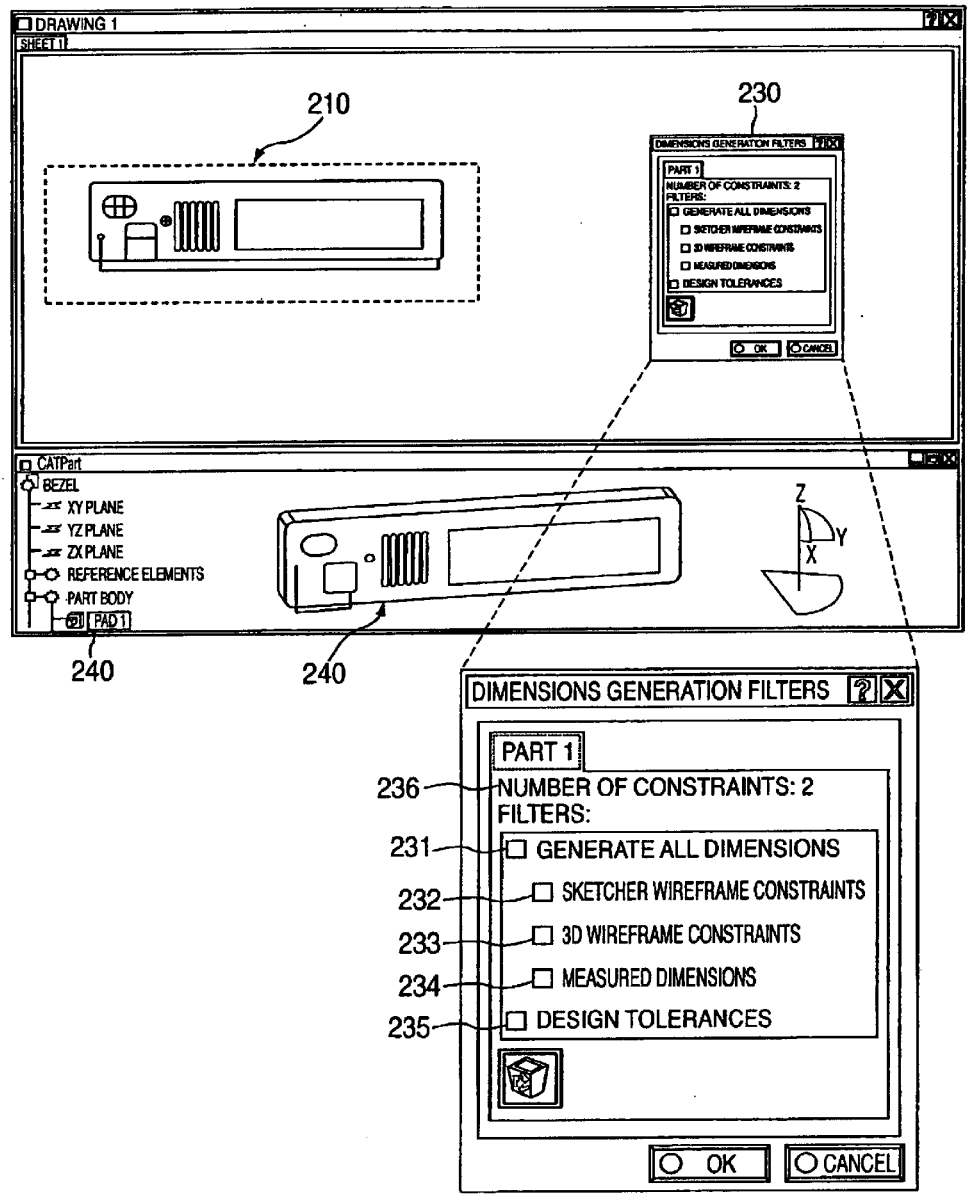
FIG. 2 illustrates an exemplary CAD/CAM display with a Filter panel.

Referring now to FIG. 2, a CAD/CAM display screen can include a 3-D model of an object 200 and a hierarchical tree 240. The hierarchical tree can allow a user to select different 3-D objects. The CAD/CAM screen can also include a 2-D generative drawing 210 corresponding with the selected view of the 3-D drawing.

A dimensions generation filter panel 230 can also be displayed. The Filter panel can be a pop-up menu or other type window that can be launched to control dimensions or other drawing data generation filter process. The Filter panel 230 can include a series of check boxes or other user interactive devices that correspond with various options relating to filters for the dimensions or constraints relating to a 2-D generative drawing of 210 the 3-D view 220.

Options that can be included on the Filter panel can include, for example, an i s option to generate all dimensions 231, an option to include sketches of wire frame constraints 232, an option to include 3-D wire frame constraints 233, an option to include measured dimensions 234, and an option to include design tolerances 235. Other options relating to filtering and general control devices can also be programmed into the filter panel. According to user needs, icons or other graphical user interactive devices can also be used to make Filter panel functions available from a desk top.

Figure 3:
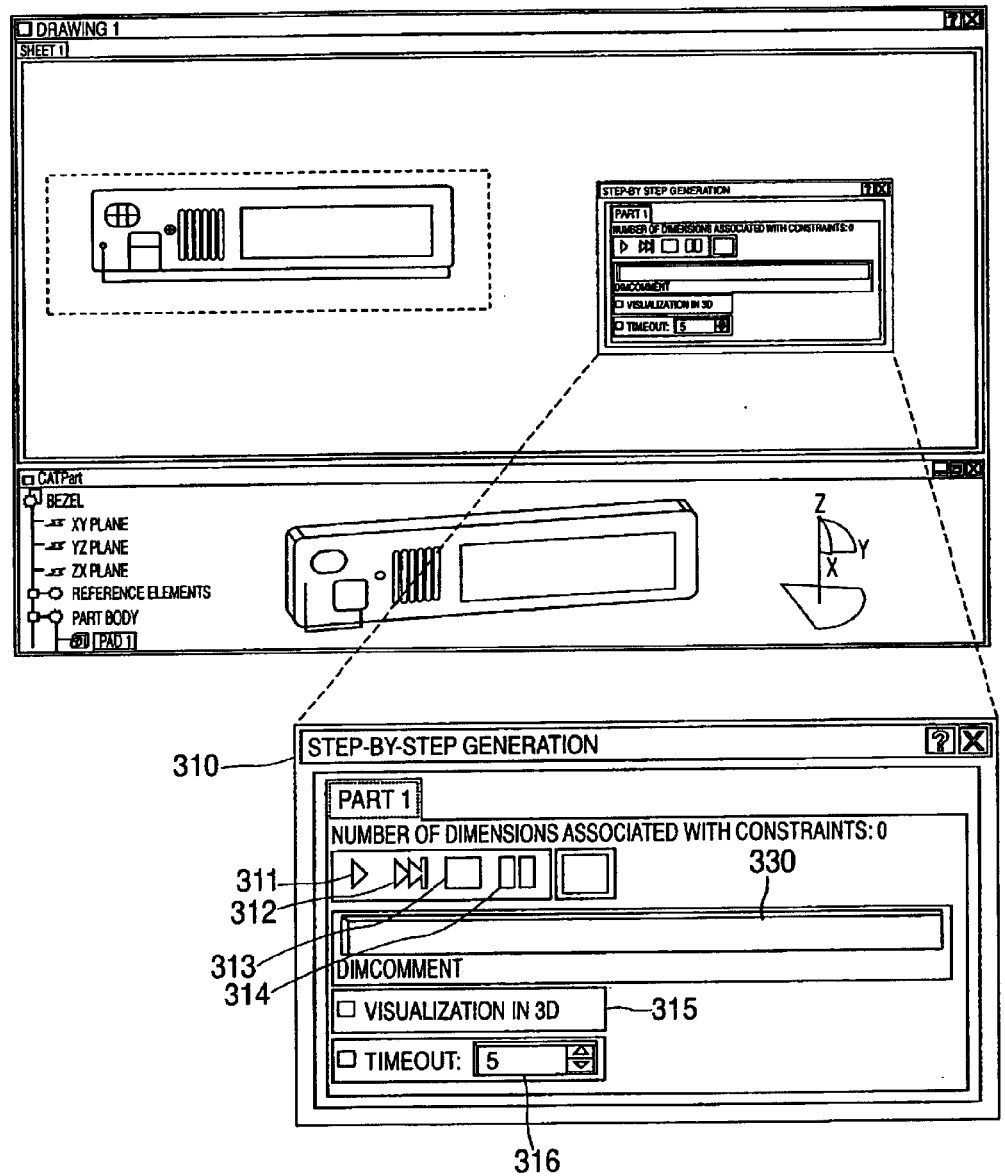
FIG. 3 illustrates an exemplary CAD/CAM display with a Step by Step panel

Referring now to FIG. 3, a step-by-step generation panel, a menu, or other type of user interactive window, can be used to facilitate control over dimension generation. A step-by-step generation panel can include icons or other user interactive devices to control the dimension generation. Icons can include, for example, an arrow icon 311 to issue a start command to begin generation of dimensions. A symbol such as a single arrow can draw upon a user familiarity with a play button on a video or audio control system. Likewise, a double arrow icon 312 can be used to accelerate the dimension generation process. A stop icon 313 can be used to halt the generation of dimensions. Other options can include a double bar 314 pause button. A bar graph 330 can be used to graphically illustrate the progression of the dimension generation. In addition, controls can be included to display a visualization in dimensions 315. An incremental window can also be included for setting the duration of the time-out 316. The time-out sets the amount of time a user has to intervene between steps of dimension generation. A higher time-out number can provide more time between generation of successive dimensions included on the 2-D generative drawing. A lower time-out number can allow the dimension generation process to proceed more quickly.

Figure 4:
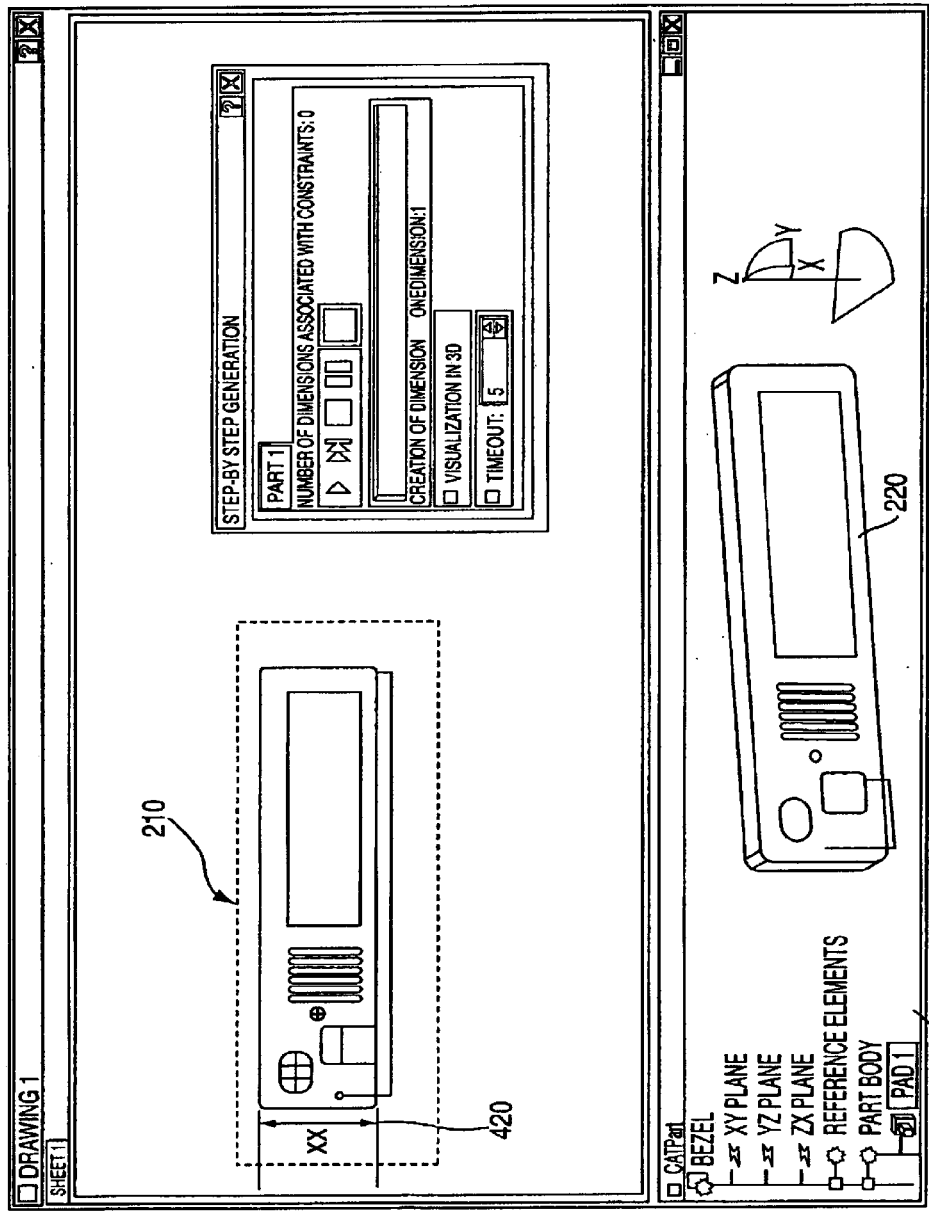
FIG. 4 illustrates a dimension extracted from a 3-D model and generated on a 2-D drawing.

Referring now to FIG. 4, a dimension can be extracted from a 3-D model 220 and visualized on the 2-D drawing 210. The dimension can also be visualized on the 3-D model 410. The corresponding dimension on the 2-D model 420, can be displayed if the user elects to generate that drawing data modified by the user or deleted from the present view and/or the 3-D model.

Figure 5:
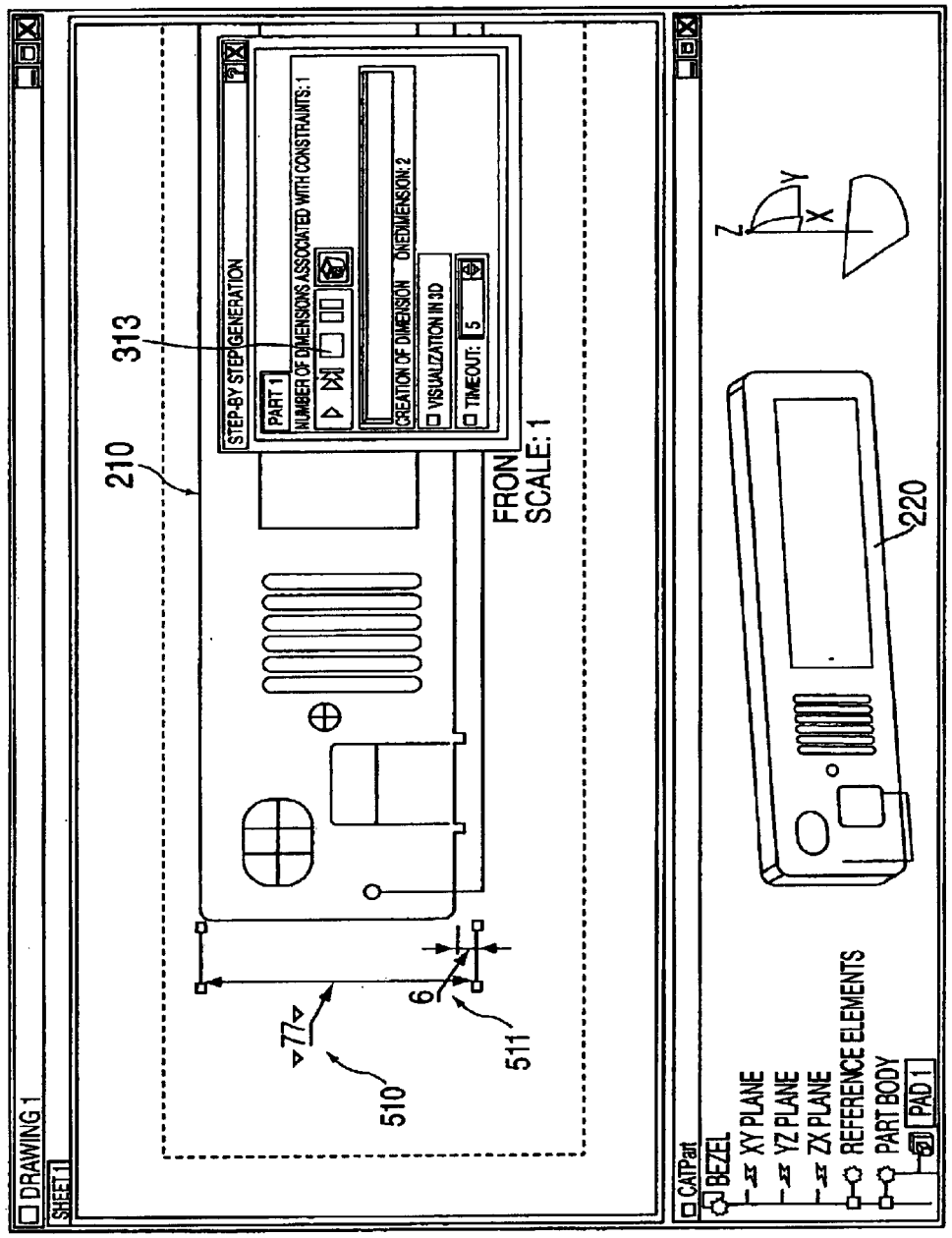
FIG. 5 illustrates generated dimensions that have been modified by a user.

Referring now to FIG. 5, during extraction of drawing data from a 3-D model 220 and generation of the data to 2-D model 210, a user can halt the generation process to perform a modification to the dimension being generated. For example, as a dimension is generated, a user can press a pause button 314. The pause button 314 can halt a time-out clock from running. While dimension generation is halted, a user can modify the content, appearance or location of a dimension generated such as 510 and 511. Modifications can include, for example, changing the font or text of the constraint generated, enhancing the text with bold, italics, underline or other text enhancements, changing the content of the text, or deleting a part of or the entire text of the dimension generated. The position of the generated dimensions can also be changed. In this manner, a user can place a dimension in a different area of a 2-D drawing.

Figure 6:
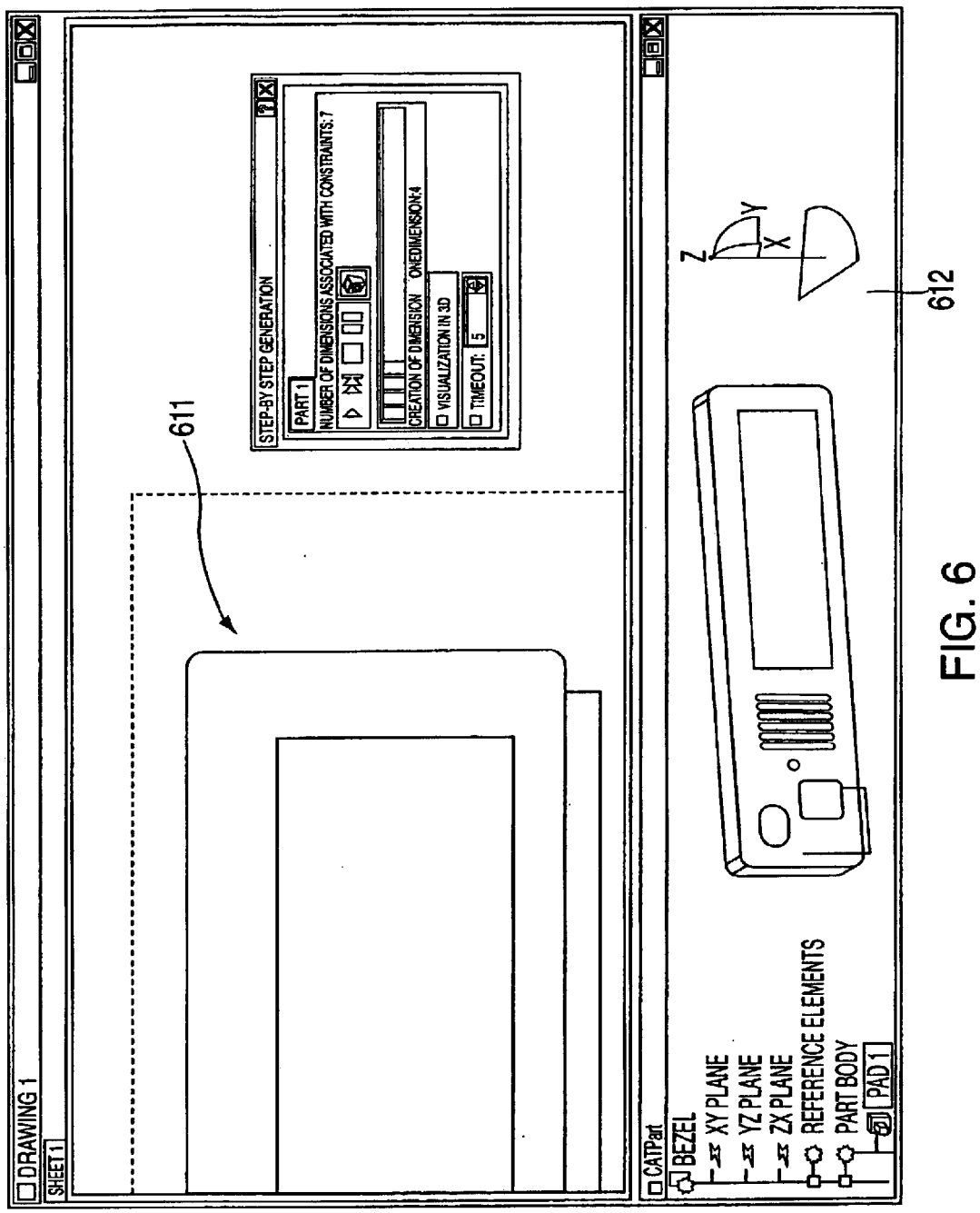
FIG. 6 illustrates deletion of a dimension from a 2-D view that is present in a 3-D model.

Referring now to FIG. 6, step-by-step dimension generation can also allow for deletion of a particular dimension. Deletion of a dimension can prevent the dimension from being generated even if it could be displayed in another view of the generative drafting. In this manner a user can efficiently remove unwanted dimensions from all views of the generative drafting. A dimension deleted from the 2-D drawing 611 can still be seen in the 3-D model 612.

Figure 7:
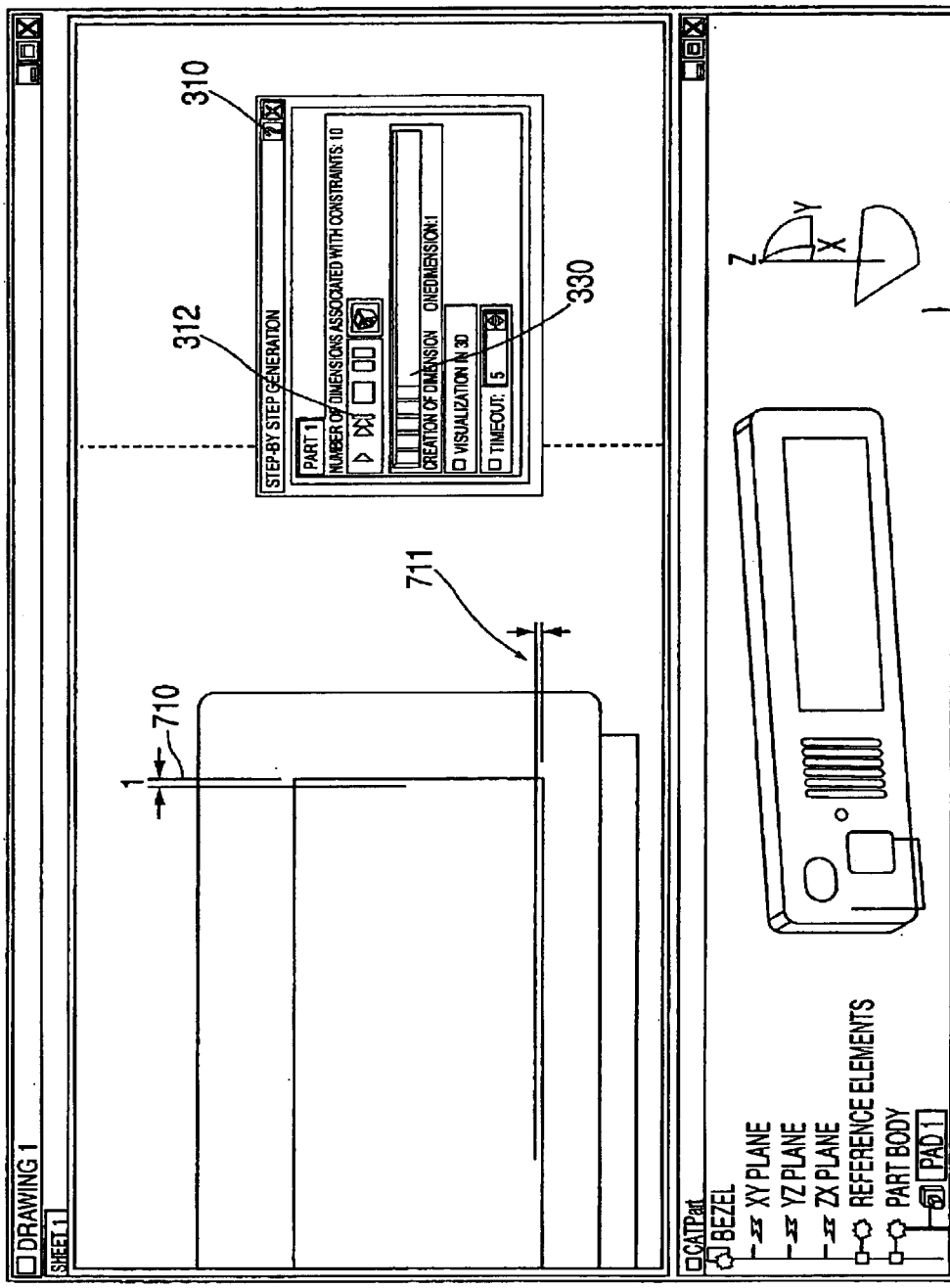
FIG. 7 illustrates multiple dimensions generated in a single step.

Referring now to FIG. 7, a fast forward control device 312 on the step-by-step panel 310 can be used to accelerate dimension generation. Activation of a fast forward button 312 enables a user to generate several dimensions, constraints, or other drawing data in a single step. In one embodiment, two constraints 710 and 711 are generated in single step. Steps can be tracked with a step bar graph 330.

Figure 8:
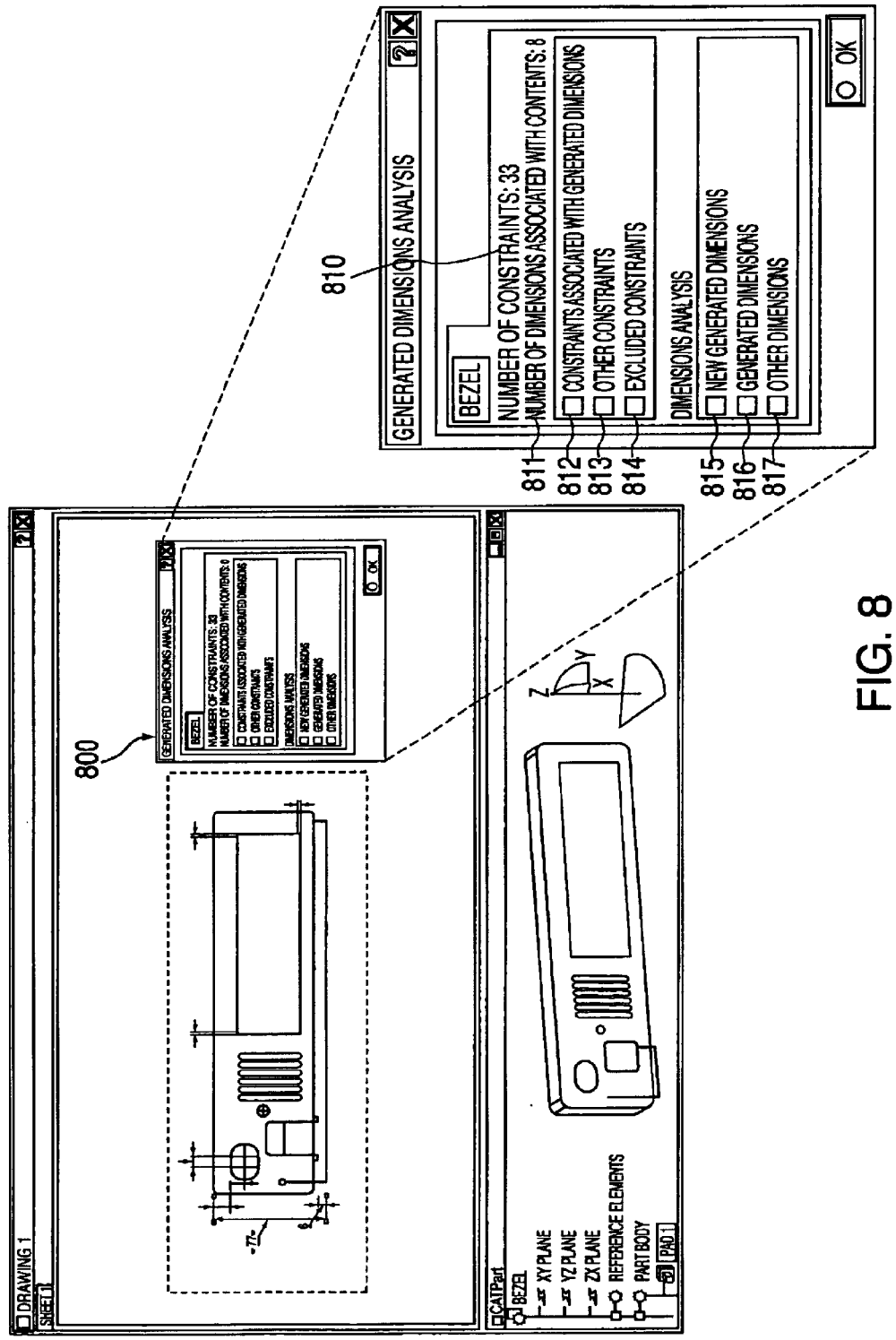
FIG. 8 illustrates an exemplary generated dimensions analysis window.

Referring now to FIG. 8, a user can stop dimension extraction and drawing data generation or allow all dimensions to generate to a point at which the generation process stops. After the dimension generation process has stopped, a generated dimensions analysis window 800, or other graphical display, can be used to display the generated results. The generated dimensions analysis window 800 can include, for example, the number of constraints on the 3-D Model 810 and the number dimensions associated with constraints generated to the 2-D drawings 811. In addition, the generated dimensions analysis window 800 can include check boxes or other user interactive devices to control the display results such as the constraints on the 3-D modest associated with the generated dimensions 812, constraints other then those associated with the generated dimension 813, or excluded constraints 814. These options can be included in a constraints analysis section of the generated dimension analysis window. A dimensions analysis section can include, for example, a check box for new generated dimensions 815, a check box for call generated dimensions 816 and a check box for other dimensions 817. Other options, statistics or graphical representations relating to the dimensions generated can also be included in the generated dimensions analysis menu 800.

Figure 9:
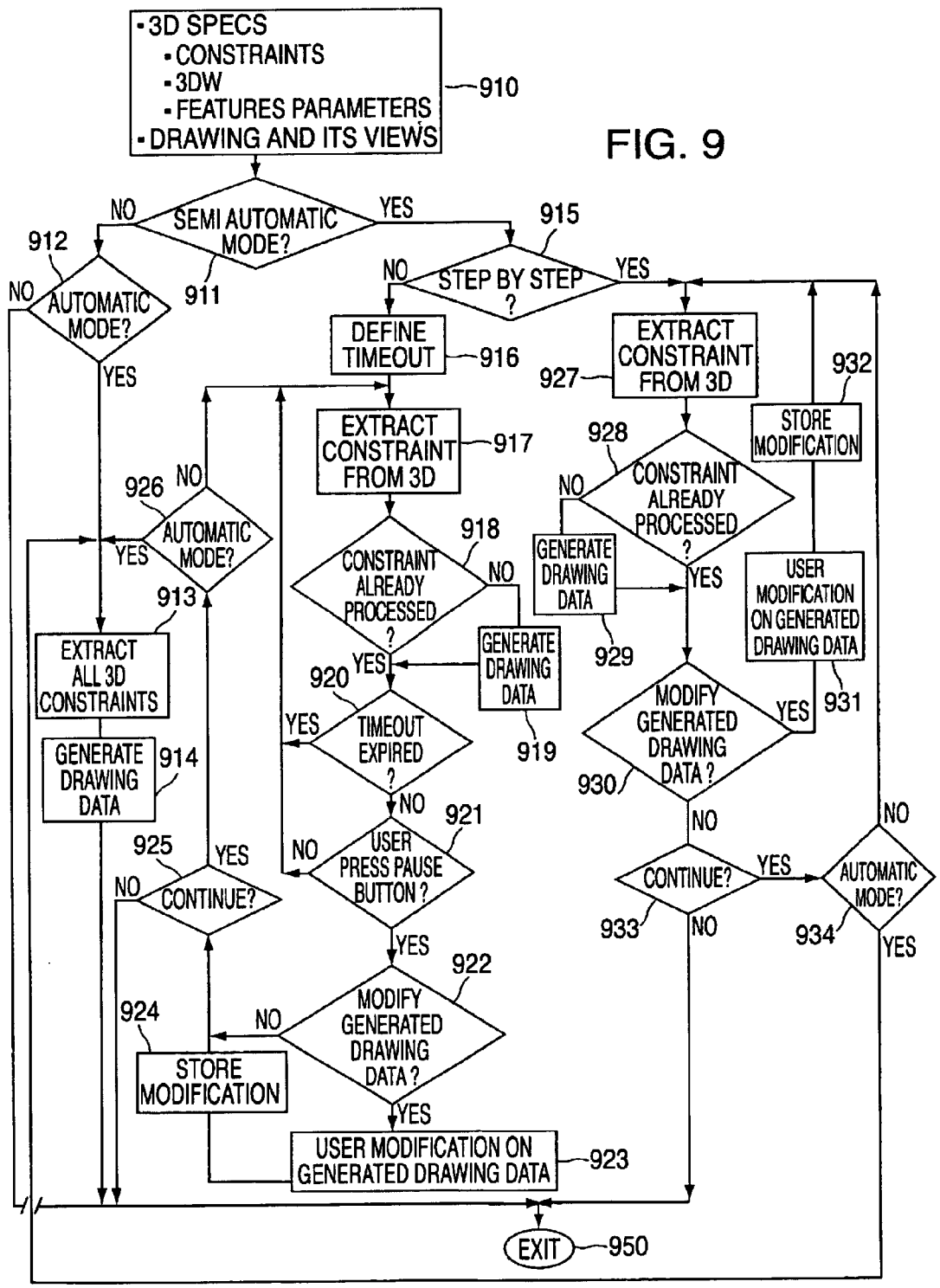
FIG. 9 illustrates a programming flow chart of one embodiment of the invention.

Referring now to FIG. 9, an exemplary flow chart of one embodiment can include for example, a program initialization stage 910 wherein a user can filter specifications to be processed during dimension generation. Specifications can include, for example, constraints 3-DW including 3-D offset between planes and 2-D numerical data in plane or Features Parameters such as, for example, a whole diameter or a drawing and its views. A user may choose to generate dimensions in a semi-automatic mode 911. A "No" response to a semi-automatic mode can allow a user to choose automatic mode 912. A subsequent "No" response to automatic mode can allow the user to exit the program 950. A "Yes" response to automatic mode 912 can cause the program to extract all 3-D constraints 913 and generate drawing data 914.

A "Yes" response to semi-automatic mode 911 can allow a user to specify step-by-step mode 915. If a user chooses not to run in step-by-step mode they can be asked to define a timeout 916. The program can then proceed to extract a constraint from the 3-D view 917 and query whether the constraint has already been processed 918. If the constraint has not been processed 918, the program can generate drawing data 919. If the timeout has expired 920 before a user has intervened by pressing a pause button 921, the program can loop around and extract another constraint from the 3-D view 917. If a user has activated a pause button or other interactive device 921 programmed to pause the process, the user can be prompted to modify generated drawing data 922. The user can also opt to make modifications on generated drawing data 923 and store a modifications 924. After storing the modification, or if the user opts not to modify generated drawing data 922, the user can be prompted as to whether they would like to continue 925. If a user wishes to continue 925 he can also be allowed to branch to automatic mode 926. If the user does not branch to automatic mode 926, the program can loop and extract a next constraint from the 3-D view 917. If a user does opt to branch to automatic mode 926 the program can proceed to extract all remaining 3-D constraints 913 and generate drawing data 914 before exiting 950.

Choosing to proceed with step-by-step processing 915 can allow the program to extract a constraint from the 3-D view 927 and query whether that constraint has already been processed 928. If the constraint has not been processed, the program can generate drawing data 929. If the constraint has already been processed, the user can be prompted to modify generated drawing data 930. If the user opts not to modify generated drawing data, the system can ask if the user wishes to continue 933. Indicating that a user does not wish to continue 933 can cause the program to exit 950. Indicating that a user does wish to continue 933 can allow a user to choose automatic mode 934. Choosing automatic mode 934 can cause the program to extract all constraints 913 and generate drawing data 914 before the program exits 950. Not choosing automatic mode 934 can cause the program to loop back and extract a next constraint 927, thereby processing each constraint in a similar fashion.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system, including at least one programmable processor coupled to receive data and instructions from, and to transmit data and instructions to, a memory storage system, at least one input device, and at least one output device. Each computer program may be implemented in a high-level procedural or object-oriented programming language, or in assembly or machine language if desired; and in any case, the language may be a compiled or interpreted language.

Generally, a processor can receive instructions and data from a read-only memory and/or a random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It can be understood that various modifications may be made without departing from the spirit and scope of the invention. Therefore, other implementations are within the scope of the following claims.

What is claimed is:

1. A CAD/CAM software control method comprising:
   generating a two-dimensional drawing from a three-dimensional computer defined model of a real-world object;
   based on the three-dimensional model, automatically generating annotation information associated with a displayed component of the two-dimensional drawing, said annotation information setting forth information relevant to physical construction of the real-world object;
   forming a user interface for controlling the addition of the annotation information to the two-dimensional drawing;
   filtering the annotation information generated from the three-dimensional model to determine a subset of the annotation information to be placed on the two-dimensional drawing, said-filtering being guided by user input data interactively received at the user interface;
   adding the filtered subset of the annotation information to the two-dimensional drawing,
   and wherein the annotation information added to the two-dimensional drawing is configured for display in the two-dimensional drawing.

2. The CAD/CAM software control method of claim 1 wherein the annotation information is a measurement or a constraint.

3. The CAD/CAM software control method of claim 1 wherein the annotation information is added to the two-dimensional drawing semi-automatically responsive to the expiration of a predetermined time-out period and in the absence of an intervening user action.

4. The CAD/CAM software control method of claim 3 wherein the intervening action comprises activation of a pause button.

5. The CAD/CAM software control method of claim 1 additionally comprising the step of modifying the annotation information.

6. The CAD/CAM software control method of claim 1 further comprising tracking interactive user input data indicating that a second subset of the annotation information is not to be added to the two-dimensional drawing and, during a subsequent generation of the two-dimensional drawing, automatically determining that the second subset of annotation information should not appear in the generated two-dimensional view.

7. The CAD/CAM software control method of claim 1 additionally comprising the step of stopping the generation of annotation information and forming an additional two-dimensional drawing.

8. The CAD/CAM software control method of claim 7 wherein a modification of the annotation information is reproduced in a subsequently formed two-dimensional drawing.

9. The CAD/CAM software control method of claim 1 additionally comprising selecting between an automatic or semi-automatic mode of annotation information generation, wherein selecting an automatic mode causes the software to branch and generate annotation information without requiring the formation of a user interface for controlling the addition of a subsequent annotation information item to the two-dimensional drawing and adds the annotation information item to the two-dimensional drawing without requiring activation of a user interactive device.

10. The CAD/CAM software control method of claim 9 additionally comprising selecting between an automatic or semi-automatic mode of annotation information generation, wherein the semi-automatic mode comprises a time-out period during which a user can activate a user interactive device causing the annotation information generation process to be paused.

11. The CAD/CAM software control method of claim 10 additionally comprising the step of modifying annotation information while the generation process is paused.

12. The CAD/CAM software control method of claim 10 additionally comprising the step of automatically generating additional annotation information following modification of the annotation information.

13. The CAD/CAM software control method of claim 1 additionally comprising the step of filtering particular annotation information from the two-dimensional drawing.

14. The CAD/CAM software control method of claim 1 additionally comprising the step of filtering particular two-dimensional drawings from being formed.

15. A computer system for controlling generation of annotation information relating to a two-dimensional drawing of a three dimensional computer defined model of a real-world object, the system comprising:
   a processor operatively interconnected to a memory, said memory comprising stored instructions to configure the processor to form the two-dimensional drawing of the three dimensional model of the real-world object and to automatically generate annotation information associated with the two-dimensional drawing based on the three-dimensional model, said annotation information setting forth information relevant to physical construction of the real-world object;
   a user input device;
   a display; and
   a graphical user interface comprising user interactive devices wherein the system is responsive to activation of the user interactive devices to effect a semi-automatic mode of transfer of a subset of the annotation information, and wherein the system is configured to identify the subset based on data interactively received at the graphical user interface, said data being processed by instructions to filter the annotation information generated from the three-dimensional model to determine said subset of annotation information, said filtering being based the data interactively received at the graphical user itnerface.

16. The computer system of claim 15 wherein the annotation information comprises a dimension or a constraint.

17. The computer system of claim 15 wherein the annotation information is added to the two-dimensional drawing semi-automatically responsive to the expiration of a predetermined time-out period without an intervening user action.

18. A computer program residing on a computer-readable medium, the program comprising instructions for causing a computer to:
   form a two-dimensional drawing of a three dimensional computer defined graphical model of a real-world object;

based on the three-dimensional model, automatically generating annotation information associated with a component of the two-dimensional drawing, said annotation information setting forth information relevant to physical construction of the real-world object;

form a user interface for interactively controlling the addition of the annotation information to the two-dimensional drawing;

filter the annotation information generated from the three-dimensional model to determine a subset of the annotation information to be placed on the two-dimensional drawing, said filtering being guided by user input data interactively received at the user interface;

add the selected subset of the annotation information to the two-dimensional drawing; and configure the added subset of annotation information for display as graphical elements of the two-dimensional drawing.

19. A method of interacting with a CAD/CAM system to add annotation information to a two-dimensional drawing of a three dimensional model, the method comprising:

launching an application which includes a command to add annotation information in a semi-automatic mode, said annotation information setting forth information relevant to physical construction of the real-world object;

extracting annotation information from a three dimensional model of a real-world object;

automatically generating the annotation information on the two-dimensional drawing based on the three dimensional model; and interactively modifying the generated annotation information based on input data received from a user, including determining a subset of the annotation information to be generated on the two dimensional drawing;

wherein the annotation information generated on the two-dimensional drawing is configured for display as graphical elements of the two-dimensional drawing.

20. The method of claim 19 additionally comprising the step of storing the modified annotation information.

21. A method of interacting with a computer so as to add annotation information to a two-dimensional drawing of a three-dimensional model of a real-world object, the method comprising:

launching an application which includes a command to add annotation information to a three-dimensional model of a real-world object in a semi-automatic mode, said annotation information setting forth information relevant to physical construction of the real-world object;

defining a timeout period;

extracting annotation information from the three-dimensional model;

generating the annotation information on the two-dimensional drawing; and pausing the extraction of annotation information from the three-dimensional model; and modifying the generated annotation information based on input data received from a user, including determining a subset of the annotation information to be generated on the two dimensional drawing;

wherein the annotation information generated on the two-dimensional drawing is configured for display as graphical elements of the two-dimensional drawing.

22. A programmed computer for adding annotation information to a two-dimensional drawing of a three-dimensional model of a real-world object comprising:

a memory having at least one region for storing computer software code;

a processor operatively interconnected to the memory for executing software code stored in the memory, wherein the software code causes the computer to:

display a first user interactive interface for selecting specified annotation information, a drawing and selected views of the drawing, said annotation information setting forth information relevant to physical construction of the real-world object;

display a second user interactive interface for selecting between an automatic and semi-automatic mode of generating annotation information;

display a third user interactive interface for selecting step-by-step processing or time-out processing of annotation information;

generate annotation information based on the three-dimensional model of the real-world object;

allow user modification of the annotation information;

store modified annotation information; and add the annotation information to the two-dimensional drawing;

wherein the annotation information added to the two-dimensional drawing is configured for display as graphical elements of the two-dimensional drawing.

23. The programmed computer of claim 22 wherein the software code additionally causes the computer to:

display a fourth user interactive interface with a user interactive device for entering a time-out period; and an interactive user device for pausing the generation of drawing data, whereby a user can modify the annotation information during the pause.

* * * * *